Figure 1:
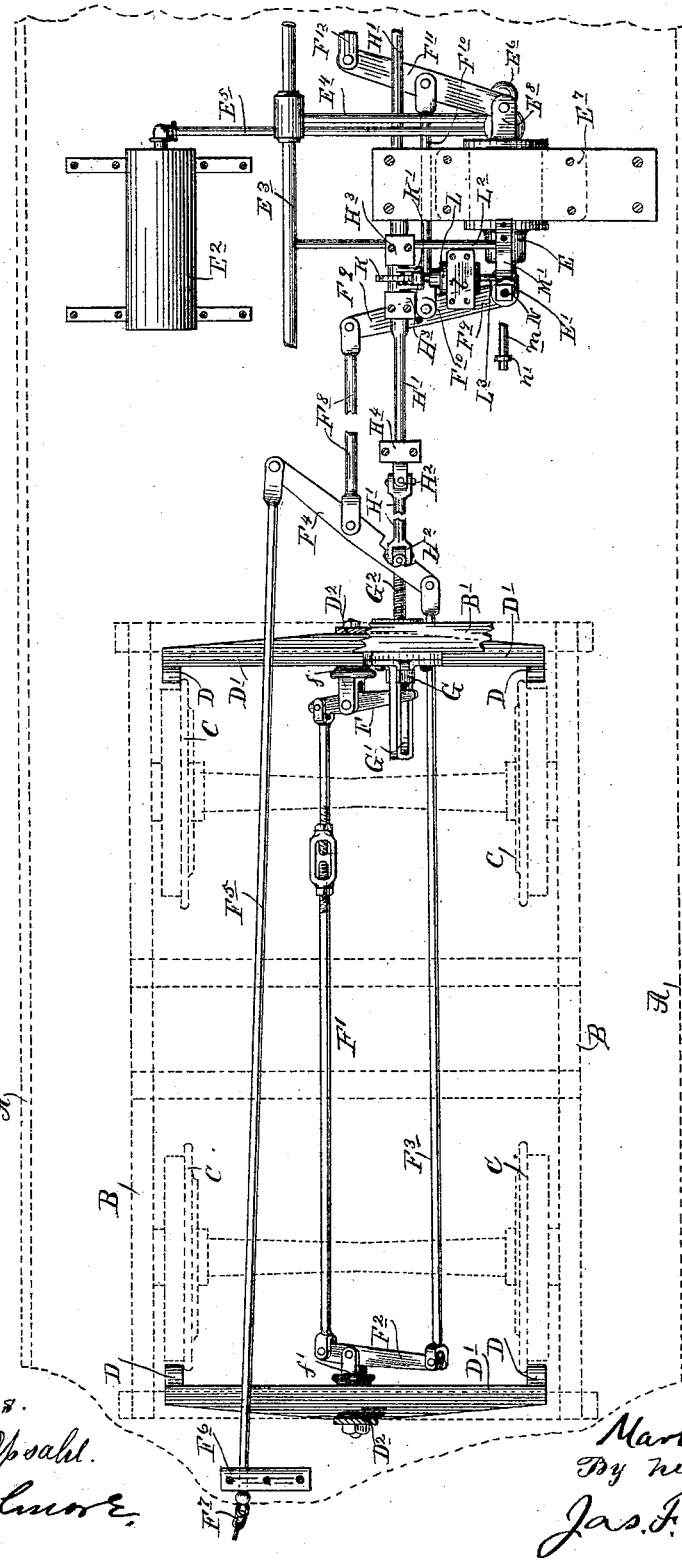

(No Model.) 3 Sheets—Sheet 1.

M. E. McKEE.
AUTOMATIC BRAKE ADJUSTER.

No. 489,494. Patented Jan. 10, 1893.

Witnesses.
A. H. Opsahl.
E. F. Elmore.

Inventor
Martin E. McKee
By his Attorney.
Jas. F. Williamson

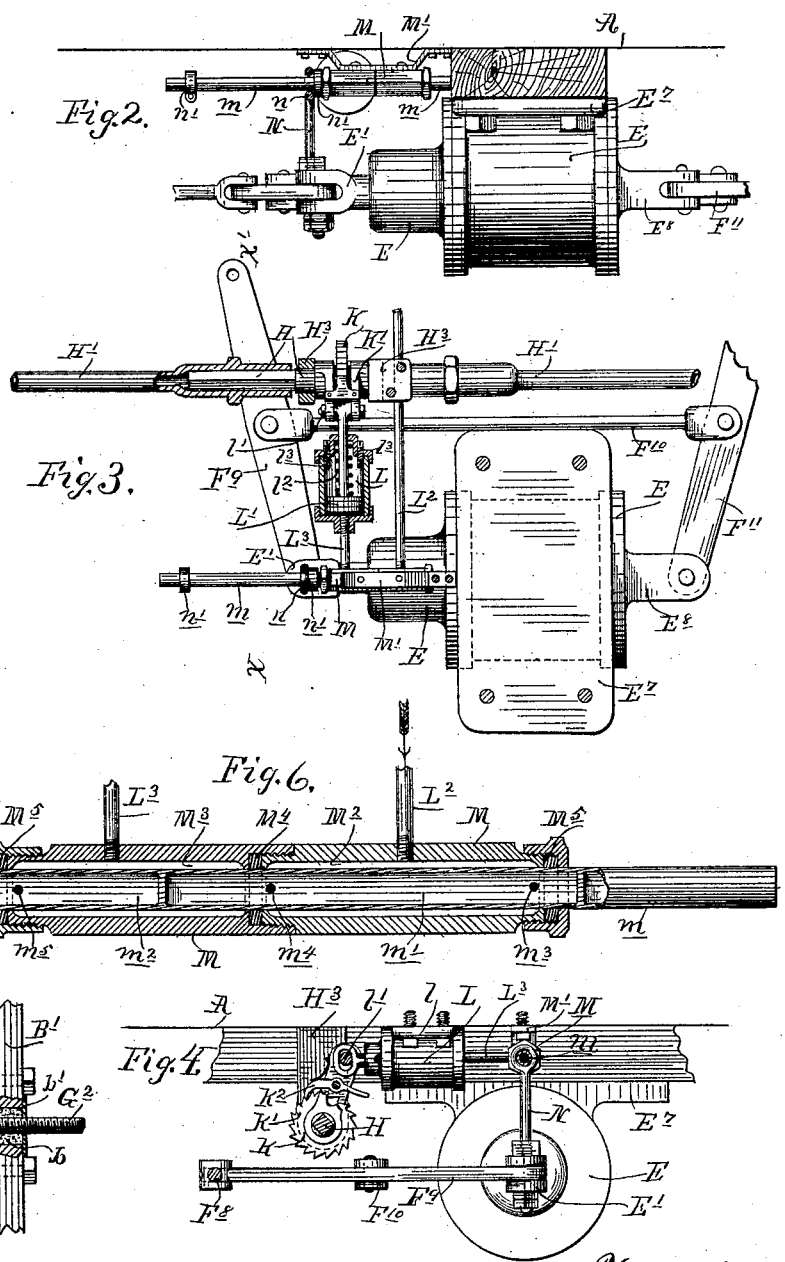

(No Model.) 3 Sheets—Sheet 3.
M. E. McKEE.
AUTOMATIC BRAKE ADJUSTER.

No. 489,494. Patented Jan. 10, 1893.

Witnesses
A. H. Opsahl.
E. F. Elmore.

Inventor
Martin E. McKee
By his Attorney.
Jas. F. Williamson

UNITED STATES PATENT OFFICE.

MARTIN E. McKEE, OF ST. PAUL, MINNESOTA.

AUTOMATIC BRAKE-ADJUSTER.

SPECIFICATION forming part of Letters Patent No. 489,494, dated January 10, 1893.

Application filed June 4, 1892. Serial No. 435,485. (No model.)

*To all whom it may concern:*

Be it known that I, MARTIN E. McKEE, a citizen of the United States, residing at St. Paul, in the county of Ramsey and State of Minnesota, have invented certain new and useful Improvements in Automatic Brake-Adjusters; and I do hereby declare the following to be a full, clear, and exact description of the invention, such as will enable others skilled in the art to which it appertains to make and use the same.

My invention relates to brakes; and has for its object to provide a simple and efficient form of automatic compensating device or brake-adjuster, for taking up the slack produced by the wear and tear on the brake-shoes. It will also take up the slack produced by the wear and tear in the brake operating connections; but this is simply incidental to its main purpose.

The invention herein described is in the same line as the inventions shown and described in my pending application Serial No. 433,523, filed of date May 19, 1892, entitled automatic brake adjuster.

The invention is capable of general application to many classes of brakes; but was especially designed for railway air-brakes. The special necessity for some such a device will be readily understood, from the following statement which was made in said former case, to-wit,—The brake-shoes in railway air-brakes, are made of relatively soft metal as compared with the wheels and wear away very rapidly under the surface. It is also a well-known fact, that it is desirable to set the brakes under uniform pressure, or more accurately stated, to have the same so arranged that they will always be set to a maximum pressure. To accomplish this result, it is desirable to have the auxiliary air reservoir charged at a constant pressure, and to have the piston of the air-brake motor, maintain a substantially uniform stroke. Otherwise, if the piston movement be increased, while the pressure remains uniform in the reservoir, the braking power will be decreased by the increased expansion. The slack produced by the wear on the brake-shoes from the time they are new until the time they are worn out, is from six to eight inches, measured on the piston stroke. This amount of variation cannot be taken up by the increase of the piston stroke, without rendering the brake inefficient and unreliable, on account of the decreased power.

It is the object of my invention, to provide automatic mechanism for taking up the slack, thus incurred by the wear of the brake shoes, thereby maintaining an approximately uniform stroke of the piston. To this end, I provide a take-up device, and operate the same by automatic mechanism arranged, either to take up the slack whenever it occurs, or whenever it reaches an extent that would otherwise impair the braking power from the air-brake apparatus.

In the accompanying drawings, I have illustrated my invention, as applied in connection with the Westinghouse system of air-brake apparatus, and the Hodge system of "brake rigging."

Figure 8:
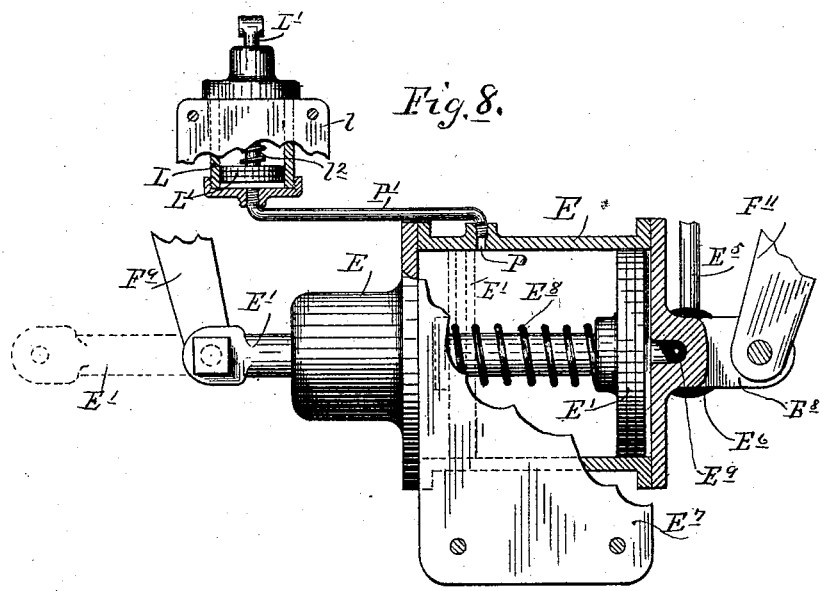

In the drawings like letters referring to like parts throughout the several views;—Figure 1 is a plan view showing the invention, as applied in use on railway cars, a portion of the car-body and one of the trucks being represented in dotted lines. Figs. 2 and 3 are respectively a side elevation and a plan view, illustrating one form of the automatic mechanism, for operating the take-up device, the car-body in both cases being removed. Fig. 4 is a transverse vertical section on the line X X' of Fig. 3, looking toward the right, with reference to Figs. 1, 2 and 3. Fig. 5 is a detail, showing one of the take up devices proper, as applied to the dead-lever, some parts being broken away. Fig. 6 is a central longitudinal horizontal section of a novel form of valve for the take up motor; Fig. 7 is a detail of a portion of the trip rod for operating the said valve. Fig. 8 is a plan view, some parts being broken away and others shown in section, showing a modification in the valve mechanism for controlling the take up motor.

A represents in dotted lines the position of the car-body, B a part of one of the truck-frames, and C the truck-wheels.

B' represents in full lines a part of the inner cross beam of the truck-frame.

D are the brake-shoes and D' the brake-beams and $D^2$ the retracting-springs, which normally hold the shoes out of contact with the wheels.

Having regard to the motive power appliances, E is the cylinder and E' the piston of the air motor, $E^2$ is the auxiliary or storage reservoir, $E^3$ the main supply pipe, $E^4$ and $E^5$ the circulating pipes, the former from the supply pipe, and the, latter from the reservoir, in communication with each other and the cylinder of the motor through suitable valve mechanism $E^6$, and $E^7$ is the bearing for the cylinder, all of the well-known standard Westinghouse construction.

Having regard to the brake rigging, F is the dead-lever pivoted to the inner brake-beam, as shown at $f$, and having its free end working against an adjustable base of resistance, which is supported from the inner truck-beam B', as will later appear. F' is a connecting rod from the power end of the "dead lever," to the weight end of the "live-lever" $F^2$, pivoted to the outer brake-beam, as shown at $f'$. $F^3$ is a connecting-rod from the power end of the lever $F^2$, to the outer end of the floating-lever $F^4$; and $F^5$ is the resistance rod from the inner end of the floating-lever to the resistance-block $F^6$, fixed to the car-body, and connected at its outer end, by chain $F^7$ to the hand-brake, not shown. $F^8$ is the main brake rod, connecting the floating-lever with the inner end of the primary brake-lever $F^9$, which is directly connected at its outer end to the piston-rod or prime-mover of the air brake motor. A tie-rod $F^{10}$ connects the primary brake-lever $F^9$ with a twin-lever $F^{11}$, which is pivoted at its outer end to a projecting-lug $E^8$ from the rear end of the motor and is connected at its inner end to the twin brake-rod $F^{12}$, for operating the duplicate parts of the brake-rigging to the other truck, not shown.

The construction and operation of these motive power appliances and of this brake-rigging, are well known and further description of the same is deemed unnecessary for the purposes of this case. It is obvious that whenever the piston or prime mover of the air-motor is moved outward, the brakes will be set.

I will now give a detailed description of my attachment. The free end of the "dead lever" F, works in a yoke G' fixed to the inner cross beam B' of the truck frame; and the resistance block G also works in the slot of this yoke as a guide, and is held from lateral displacement, by flange $g$, embracing the body of the yoke. The resistance block is wedge-shaped on its outer face and bears with the angle of the wedge directly against the free end of the "dead-lever." A screw-threaded push-rod $G^2$ works through a screw-threaded nut or plate $G^3$, fixed to the outer face of the truck-beam B'; and has its outer end working in contact with the back of the resistance-block G. It is evident that by turning this push-rod $G^2$ in the fixed nut-plate, that the resistance block may be moved outward along the yoke G' as a guide; and will thus take up the slack. The rod $G^2$ is connected with a sectional shaft, consisting of section H mounted against endwise movement in fixed bearings $H^3$, depending from the bottom of the car, the section H' mounted with freedom for a sliding movement, and the knuckle joint section $H^2$ connecting the same with the rod $G^2$. The sliding section H' is mounted in a bearing-block $H^4$, depending from the car-body. The part of the section H, which projects beyond its bearings, is square in cross-section and fits a correspondingly formed socket, in the inner end of the section H'. This connection forms a telescoping joint between the sections H and H', while permitting their rotary motion to be effected by a wrench-like action. The parts extending to the resistance block on the opposite truck, not shown, are duplicates of the parts just noted, in all respects, except that the thread on the push-rod $G^2$, is left handed instead of right. The central longitudinally fixed section H of this sectional shaft, has rigidly secured thereto a ratchet wheel K, between the bearing blocks $H^3$, and is embraced by the prongs of a ratchet-lever K' loosely pivoted on the shaft and provided with the spring-held pawl $K^2$, engaging the teeth of the ratchet-wheel. For operating this ratchet mechanism and through the same the take-up device, I provide a small air-motor which I call the take-up motor, and control the same from the prime mover of the brake operating motor, by means of suitable valve mechanism operated from the brake motor, located in the air supply passage to the take up motor. Of this take-up motor, L is the cylinder and L' is the piston. The cylinder L has its bearing block $l$ secured to the underside of the car-body and the piston L has its extended rod connected, by means of a slot and pin connection $l'$, with the upper and free end of the ratchet lever K'. Hence, as is obvious, every time this piston L' is given a stroke, the sectional shaft will be turned a fraction of a revolution, and through the same and the screw-threaded push-rods $G^2$, will force outward the resistance blocks G, thus taking up the slack. This outward movement of the piston was effected against, and the return thereof effected by, a coiled retracting spring $l^2$ wound around the piston rod. The amount of movement given to the piston to take up the desired amount of slack, is varied at will, by set-screws $l^3$, working through one head of the cylinder and intercepting the outward movement of the said piston. The cylinder L of this ratchet motor is in communication with the main supply pipe $E^3$, through the branch pipes $L^2$ and $L^3$, and a valve M $m$, connecting the said pipes $L^2$ $L^3$. This valve is of a novel construction and is in the nature of a sliding telescoping valve, formed by a cylindrical valve stem working longitudinally in a correspondingly cylindrical seat. As herein employed, this valve M $m$, is positioned immediately over and parallel with the movement of the outer end of the piston E' of the brake operating motor, and has its seat M rigidly secured, by means of a bracket M', to the bottom of the car-body. As shown, this valve-seat M is formed of two sections secured together by means of screw-threaded engagement one upon the other, the said sections having their bores of greater diameter than the stem $m$, forming chambers $M^2$ and $M^3$. The valve stem $m$ works through stuffing box $M^4$ in the partition between the chambers and through stuffing boxes $M^5$ in the ends of the chambers. The stem $m$ is hollow and is provided with a closed and an open compartment, respectively $m'$ and $m^2$. The closed compartment $m'$ has two lateral openings $m^3$ and $m^4$, normally opening into the chamber $M^2$, and the open compartment $m^2$ has a similar opening $m^5$ normally opening into the chamber $M^3$, and hence opening the cylinder L of the ratchet motor, to exhaust.

To operate the valve, the stem $m$ is moved toward the left, with reference to Figs. 1, 2, 3 and 6. The relative positions of the openings $m^3$, $m^4$ and $m^5$ are such, that under this movement, the initial part of the same, will first bring the opening $m^5$ into or beyond the left end stuffing box, thereby closing the exhaust from the cylinder L, and immediately thereafter the opening $m^4$ will be moved into the chamber $M^3$, thereby forming a passage between the two chambers $M^2$ and $M^3$, and hence admitting air to said cylinder L to operate the ratchet or take-up motor.

I have arranged the valve to be automatically operated from the piston of the brake-motor, through the following connections, to-wit;—N is a vertical rod rigidly secured at its lower end to and carried by the outer end of the brake-motor piston-rod E' and provided at its upper end with an eye $n$ working freely on the left end part of the valve stem $m$. $n'$ are longitudinally adjustable clamp-like stop-rings clamped in position on the said left end of the valve-stem $m$. The inner one of the rings $n'$ is so set on the stem $m$, as to give to the stem its proper normal position, under the action of the piston E'. The outer ring $n'$ is then set at such distance from the inner ring as will permit the longitudinal movement of the trip-rod N thereon, under the normal stroke of the piston together with the limited amount of variation in its stroke, which is allowed before taking up the slack. Whenever the slack produced by the wear on the brake shoes, becomes so great as to require the piston to move outward beyond said limit of allowable variation, in order to set the brakes, then the trip-rod N, carried by the piston will strike the said outer ring $n'$ and operate the valve as set forth, to-wit;—the exhaust opening from the take-up motor will be closed and the air supply passage thereto will be opened. It should be here noted that the valve is thus operated by the final outward movement of the brake-motor piston, at which time the brakes are set; and hence, the take-up motor, which is preferably very small, will not, on account of its insufficient power, operate the take-up device at this time. The valve, however remains in this position during the return movement of the said brake-motor piston, and it is during this return movement, and while the brakes are released, that the ratchet motor operates the take-up device. At the final part of the return movement of the brake-motor piston, the rod N again engages the inner ring $n'$ and returns the valve-stem $m$ to its normal position, thus again opening the exhaust and shutting off the supply of air to the take-up motor cylinder. The piston of this ratchet or take-up motor will then be returned to its normal position by its retracting spring $l^2$.

As before stated, the amount of slack which will be taken up, at each stroke of the take-up motor piston, may be varied, by adjusting the set screws $l^3$ in the head of its cylinder. These parts should be so set that the amount of slack taken up should be equal to the amount of slack produced by the wear on the shoes, during the intervals between the successive operations of the device. Hence, at each operation of the take-up device, the piston of the brake motor is restored to its normal stroke. A very fine relative adjustment of these parts is, however, not absolutely essential, as the said parts will of themselves assume operative relations. In other words, the frequency of the operation of the take-up device is regulated by the amount of slack taken up at each action thereof; but the aggregate amount of slack which will be taken up during the life of the shoes will correspond to the total amount of slack produced by the wear on the shoes. This maintains the pressure from the air motor at a uniform standard of maximum efficiency. In practice this variation from the normal stroke of the piston is preferably limited to about one-half inch. It should be noted that the right end of the valve stem $m$ is of sufficient length to permit the greatest possible movement of the brake motor piston without interfering with the proper action of the said valve. It should also be noted that the telescoping connection between the longitudinally fixed section H and the sliding section H' of the sectional shaft, not only permits the sliding section H' to effect the outward movement of the resistance block, but also permits a slight telescoping movement of the same, under the vibratory and oscillatory motions of the car.

As a matter of preference the screw threaded push-rods $G^2$ work through an oil box formed by cutting out the truck-beam and filling the same with a suitable packing $b$, which is held in place by the nut-plate on one side and a cap $b'$ at the other. This keeps the push rods well lubricated.

In the modification shown in Fig. 8, the piston head E' of the brake motor, co-operates with a port P cut through the side of the cylinder E to form a valve for the take-up motor. This port P is so located with reference to the piston head's travel, that it will be passed thereby only when the piston makes an excessive stroke beyond the fixed limit of variation. When the port P is thus passed, communication is established between the take-up motor and the chamber in the brake motor behind the piston, the connection, as shown being the pipe P' and the air will tend to operate the take-up motor. But this opening of the port P to pressure occurs while the brakes are set. The operation of the take up device at this time may be made possible by the employment of a sufficiently powerful motor for operating the same. The necessity of a powerful motor is, however, greatly reduced in virtue of the novel arrangement of the valve mechanism, herein employed, to-wit: The passage communicating between the two cylinders, is, with reference to the passage $E^9$ in the valve $E^6$, which latter passage admits air to the brake motor cylinder, relatively very large. Hence, when the port P is opened, the escape of air from the chamber behind the piston of the brake motor will, during the time it is charging the take-up motor, be much more rapid than the charge to the said chamber. Thus the pressure in the said chamber will, for an instant, be reduced, permitting a slight recession of the piston, and a corresponding slack in the brake operating mechanism. At this instant the take up motor will operate to take up the slack, and, at the next instant, the pressure on the brake motor will have again assumed its maximum pressure and set the brakes under the proper tension.

As shown in Fig. 8, $E^8$ is the retracting spring to the piston of the brake motor.

When the old brake shoes are worn out and new shoes are substituted, the sliding sections of the sectional shaft are returned to their initial positions on the longitudinally fixed sections, by lifting the ratchet pawl and applying a wrench to either of the wrench surfaces $h$ carried by the sliding sections.

By actual usage I have demonstrated the practicability of my invention herein shown and described.

It will be readily understood that various changes in the construction and application of the take-up device, to adapt the same to the various systems of brake rigging, might be employed without departing from the principles of my invention. Also, that the valve mechanism controlling the take-up motor might be operated indirectly from the prime mover of the brake motor; as, for example, from some of the levers or rods of the brake rigging. In respect to the construction of the valve it should also be noted that the stem might be made solid and be provided with longitudinal grooves on its periphery to take the places of the hollow compartments $m'$ and $m^2$ and the admission and exhaust openings $m^3$ and $m^4$ and $m^5$. For instance, one groove cut from the points represented by $m^3$ and $m^4$, would serve to effect the admission; while another groove cut from $m^5$ outward to a point beyond the valve seat, would permit the exhaust.

What I claim and desire to secure by Letters Patent of the United States is as follows:

1. In a fluid pressure brake system, the combination with a take-up device and a brake motor, of an intermediate or take-up motor controlled from the brake motor for operating the take-up device.

2. In a fluid pressure brake system, the combination with a take-up device and a brake motor, of a take-up motor controlled from the brake motor and arranged to be thrown into action whenever the slack produced by the wear on the shoes becomes sufficiently great to require, for setting the brakes, a movement of the brake motor piston beyond its fixed limit of variation, substantially as described.

3. In a fluid pressure brake system, the combination with the take-up device and the brake motor, of a ratchet mechanism for operating the take-up device and a take-up motor for operating the ratchet, provided with valve mechanism controlled from the brake motor, substantially as and for the purpose set forth.

4. In a fluid pressure brake system, the combination with the take-up device and the brake motor, of a take-up motor for operating said take up device, a ratchet mechanism for transmitting the motion from said take-up motor to said take-up device, and a valve mechanism adapted to be thrown into action to operate the take-up motor, whenever the prime mover of the brake motor or its connected parts are given a movement beyond a fixed limit, substantially as described.

5. The combination with the brake motor and the take-up motor, of a slide valve for the take-up motor operated by the piston of the brake motor.

6. The combination with the brake motor and the take-up motor, of the valve mechanism for the take-up motor, comprising the valve seat M, having the chamber $M^2$ with air supply pipe $L^2$ and the chamber $M^3$ with air pipe $L^3$ to the take-up motor, and the valve stem $m$ telescoping within the said seat having the closed compartment $m'$ with admission ports $m^3$ and $m^4$ and the open compartment $m^2$ with the exhaust port $m^5$, the said parts being arranged and operating substantially as and for the purpose set forth.

7. The combination with the brake motor and the take-up motor, of the slide valve, for the take-up motor, having an extended valve stem parallel with the brake motor piston and provided on its extended part with a pair of trip surfaces or projections spaced apart from each other, and a trip carried by the piston rod of the brake motor adapted to engage with the said trip surfaces on the said valve stem to operate the said slide valve, substantially as described.

8. The combination with the brake motor of the take-up motor, the valve mechanism M, m as described, having its stem extended outward substantially parallel with the piston of the brake motor and provided with the trip surfaces n' spaced apart from each other, and the trip rod N n carried by the brake motor piston having its eye working on the valve stem m between the said trip surfaces n', substantially as and for the purposes set forth.

9. In an automatic brake adjuster, the combination with the take-up device, of a ratchet mechanism for operating the take-up device, a take-up motor for operating the said ratchet mechanism, and an adjusting device for varying the stroke of the piston of the take-up motor.

10. The combination with the take-up device and the ratchet mechanism for operating the same, of the take-up motor L' for operating the ratchet, provided with the set screws $l^3$ in the outer head of its cylinder for limiting the stroke of the piston, substantially as described.

In testimony whereof I affix my signature in presence of two witnesses.

MARTIN E. McKEE.

Witnesses:
JAS. F. WILLIAMSON,
FRANK D. MERCHANT.